(12) United States Patent
Lakshmanan et al.

(10) Patent No.: US 11,660,837 B2
(45) Date of Patent: May 30, 2023

(54) COMPOSITE GLASS PANE

(71) Applicant: SAINT-GOBAIN GLASS FRANCE, Courbevoie (FR)

(72) Inventors: Martin Lakshmanan, Aachen (DE); Claire Barras, Herzogenrath (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/257,216

(22) PCT Filed: Jul. 31, 2019

(86) PCT No.: PCT/EP2019/070627
§ 371 (c)(1),
(2) Date: Dec. 30, 2020

(87) PCT Pub. No.: WO2020/043418
PCT Pub. Date: Mar. 5, 2020

(65) Prior Publication Data
US 2021/0187901 A1 Jun. 24, 2021

(30) Foreign Application Priority Data
Aug. 29, 2018 (EP) .................................... 18191429

(51) Int. Cl.
*B32B 17/10* (2006.01)
*B32B 7/022* (2019.01)
(Continued)

(52) U.S. Cl.
CPC ................ *B32B 7/022* (2019.01); *B32B 3/08* (2013.01); *B32B 5/142* (2013.01);
(Continued)

(58) Field of Classification Search
CPC ...... B60J 1/00; B60J 1/001; B60J 1/02; B32B 17/10–1099; B32B 3/08; B32B 5/142
See application file for complete search history.

(56) References Cited

U.S. PATENT DOCUMENTS 3,616,122 A * 10/1971 Orcutt ............... B32B 17/10779
156/107
4,704,174 A * 11/1987 Valimont ............ B32B 17/1033
156/289
(Continued)

FOREIGN PATENT DOCUMENTS

CN 1555310 A 12/2004
CN 107054016 A 8/2017
(Continued)

OTHER PUBLICATIONS

Machine translation of DE102014/017388 A1, obtained from EspaceNet (Year: 2021).*
(Continued)

*Primary Examiner* — Z. Jim Yang
*Assistant Examiner* — Zheren Jim Yang
(74) *Attorney, Agent, or Firm* — Pillsbury Winthrop Shaw Pittman LLP

(57) ABSTRACT

A composite glass pane that contains two glass panes or two polymer panes or one glass pane and one polymer pane and has at least one polymer film bonded therebetween, wherein a first type of polymer film having a first stiffness is arranged in a first, larger areal region of the composite glass pane and a second type of polymer film having a second, higher stiffness than the first polymer film is arranged in at least one second areal region.

6 Claims, 2 Drawing Sheets

Figure 1A:
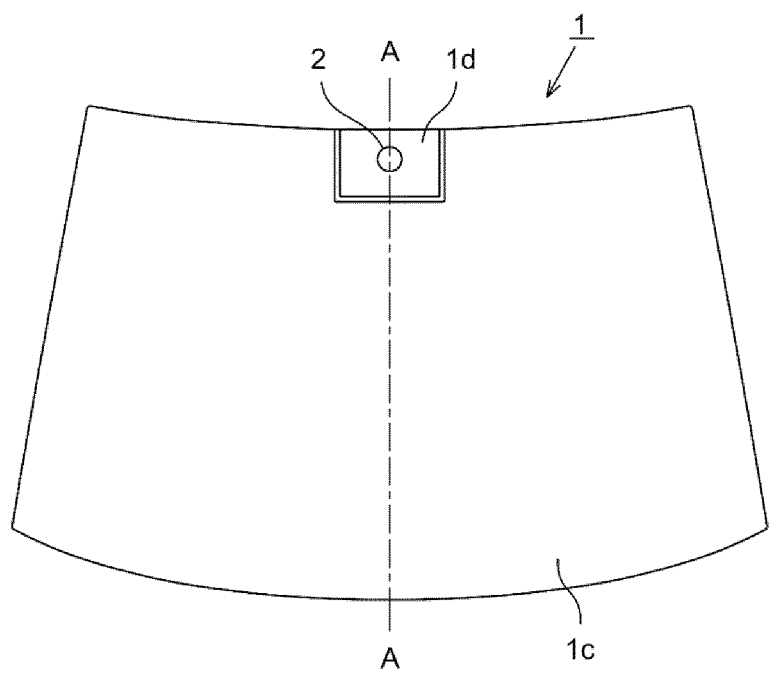

(51) Int. Cl.
  *B32B 3/08* (2006.01)
  *B32B 5/14* (2006.01)
  *B60J 1/00* (2006.01)
(52) U.S. Cl.
  CPC .. *B32B 17/10018* (2013.01); *B32B 17/10036* (2013.01); *B32B 17/1055* (2013.01); *B32B 17/10293* (2013.01); *B32B 17/10743* (2013.01); *B32B 17/10752* (2013.01); *B32B 17/10761* (2013.01); *B60J 1/001* (2013.01); *B32B 2307/546* (2013.01); *B32B 2307/558* (2013.01); *B32B 2307/732* (2013.01); *B32B 2605/006* (2013.01)

(56) References Cited

U.S. PATENT DOCUMENTS

| | | | | |
|---|---|---|---|---|
| 5,160,780 | A * | 11/1992 | Ono | C03C 27/048 428/447 |
| 5,587,236 | A * | 12/1996 | Agrawal | B32B 17/10036 248/467 |
| 6,261,672 | B1 * | 7/2001 | de Paoli | B32B 17/10293 156/303.1 |
| 6,313,796 | B1 * | 11/2001 | Potin | B32B 17/10036 343/700 MS |
| 7,553,536 | B1 * | 6/2009 | Naoumenko | B32B 17/10366 428/192 |
| 10,562,274 | B1 * | 2/2020 | Kingman | B32B 17/10036 |
| 2002/0006504 | A1 * | 1/2002 | Rehfeld | B32B 17/1055 428/212 |
| 2005/0195115 | A1 * | 9/2005 | Yegin | H01Q 1/325 343/713 |
| 2006/0005482 | A1 * | 1/2006 | Bennison | B32B 17/10036 52/204.5 |
| 2006/0228529 | A1 * | 10/2006 | Liposcak | B32B 17/10247 428/189 |
| 2006/0255486 | A1 | 11/2006 | Benson, Jr. et al. | |
| 2007/0011962 | A1 * | 1/2007 | Erskine | F41H 5/263 52/204.71 |
| 2009/0148642 | A1 * | 6/2009 | Mauser | B32B 5/024 428/38 |
| 2011/0169705 | A1 * | 7/2011 | Goldberger | H01Q 1/325 65/102 |
| 2014/0141206 | A1 * | 5/2014 | Gillard | B32B 17/10137 428/174 |
| 2014/0318058 | A1 * | 10/2014 | Morgan | E04B 2/90 52/235 |
| 2015/0093539 | A1 * | 4/2015 | Krugmann | B32B 17/10293 428/192 |
| 2015/0111016 | A1 | 4/2015 | Fisher et al. | |
| 2015/0151611 | A1 * | 6/2015 | Gansen | H01Q 1/325 428/138 |
| 2016/0250825 | A1 * | 9/2016 | Cleary | B32B 17/10293 428/215 |
| 2016/0257094 | A1 * | 9/2016 | Lestringant | B32B 17/10119 |
| 2016/0282645 | A1 | 9/2016 | Wang et al. | |
| 2016/0361898 | A1 * | 12/2016 | Sadakane | B60J 1/02 |
| 2017/0129219 | A1 * | 5/2017 | Uebelacker | B60J 1/00 |
| 2017/0361594 | A1 * | 12/2017 | Karagiannis | B32B 25/08 |
| 2019/0366691 | A1 * | 12/2019 | Iwamoto | B32B 17/10761 |
| 2019/0389383 | A1 * | 12/2019 | Yajima | B60J 1/02 |
| 2021/0221101 | A1 * | 7/2021 | Bronstein | B32B 3/08 |

FOREIGN PATENT DOCUMENTS

| | | | |
|---|---|---|---|
| DE | 199 02 471 A1 | 8/2000 | |
| DE | 10 2013 207150 A1 | 10/2014 | |
| DE | 102014221245 A1 * | 4/2016 | .......... B32B 17/064 |
| DE | 10 2014 017388 A1 | 5/2016 | |
| DE | 102014017388 A1 * | 5/2016 | ............. B60J 1/001 |
| EP | 3 118 176 A | 1/2017 | |
| JP | H06-99547 A | 4/1994 | |
| JP | H08-39746 A | 2/1996 | |
| JP | 2008133141 A * | 6/2008 | ....... B32B 17/10761 |
| JP | 2016-539890 A | 12/2016 | |
| JP | 2021-522141 A | 8/2021 | |
| RU | 2486062 C2 | 6/2013 | |
| WO | WO-9302269 A1 * | 2/1993 | ....... B32B 17/10036 |
| WO | WO 2012/148630 A2 | 11/2012 | |
| WO | WO 2015/054112 A1 | 4/2015 | |
| WO | WO 2015/137211 A1 | 9/2015 | |
| WO | WO 2019/212062 A1 | 11/2019 | |

OTHER PUBLICATIONS

Machine translation of JP2008/133141 A, obtained from J-PlatPat. (Year: 2022).*
Machine translation of DE 102014/221245 A1.*
International Search Report as issued in International Patent Application No. PCT/EP2019/070627, dated Oct. 7, 2019.

* cited by examiner

COMPOSITE GLASS PANE

CROSS-REFERENCE TO RELATED APPLICATIONS

This application is the U.S. National Stage of PCT/EP2019/070627, filed Jul. 31, 2019, which in turn claims priority to European patent application number 18191429.2 filed Aug. 29, 2018. The content of these applications are incorporated herein by reference in their entireties.

The invention relates to a composite glass pane, which comprises two glass panes or two polymer panes or one glass pane and one polymer pane and at least one polymer film bonded therebetween. This polymer film can also be a laminate of multiple films, for example, three.

Such composite glass panes have been used in large numbers for decades in various technical areas, in particular in building glazing and in vehicle construction. Selection of the materials used and the dimensioning of the components depends on the requirements of the specific intended use, in particular with regard to the desired mechanical load capacity of the finished glazing, taking into account the constraints imposed by the framing and any add-on parts. It goes without saying that designs that can withstand relatively high or maximum loads, such as explosion-proof glazings or glazings in armored vehicles, are considerably more expensive than standard designs.

Known from US 2016/0282645 A1 is a composite glass pane in which the intermediate layer includes various regions with different properties.

DE 10 2014 017 388 A1 discloses a composite glass pane implemented as a side window pane of a passenger car, in which a type of intermediate layer film different from that in the rest of the side window pane is arranged in a fixing portion.

DE 10 2013 207 150 A1 discloses a method and device for producing a film composite that enables gapless joining of multiple films of the same type at the edge regions where they abut one another.

Especially in the automobile industry, there is a trend toward use of thinner and thus lighter glasses in composite glass panes as part of efforts regarding weight reduction and resultant fuel and electricity savings. At the same time, these glazings must satisfy defined mechanical requirements that are specified in relevant industry standards. This applies, among other things, to resistance against forces that act on add-on parts on panes, for instance, inside mirrors, rain sensors, etc., and are transferred to the pane at the attachment surface itself. It has been found that the use of relatively thin panes for producing composite glass panes leads to problems in this regard.

The object of the invention is, consequently, to provide an improved composite glass pane which, on the one hand, enables the use of thinner panes to form the composite glass pane and, thus, reduced weight thereof, and, on the other, ensures compliance with relevant standards for the mechanical load capacity of the composite glass pane and which can also be produced cost-effectively.

This object is accomplished by a composite glass pane with the features of claim 1. Expedient further developments of the inventive idea constitute the subject matter of the dependent claims. Further claimed is a film product with the features of claim 15, which can, in principle, be manufactured as an intermediate product for producing the composite glass pane according to the invention and marketed separately.

The invention includes the idea of counteracting the reduction in the mechanical load capacity associated with using thinner glass panes (or relatively thin panes of a different material, for instance, polycarbonate) by dealing with the polymer film joining the glass panes. It further includes the idea of accomplishing this by using a polymer film with greater stiffness or a higher modulus of elasticity. And finally, in light of the costs of the product, the invention includes the idea of providing this polymer film having higher stiffness (which is more expensive than polymer films customarily used for this purpose) only locally in at least one areal region of the composite glass pane instead of over the entire surface.

Included in the context of the invention are composite glass panes with two glass panes or with two polymer panes or with one glass pane and one polymer pane. In a preferred embodiment, the composite glass pane contains at least one polymer pane. This yields a significant weight reduction compared to an embodiment with two glass panes. Preferably, the at least one polymer pane is a polycarbonate pane or a polymethyl methacrylate pane. Particularly preferably, the at least one polymer pane is a polycarbonate pane.

The composite glass pane according to the invention has a first, larger areal region and a second areal region. The second areal region is thus smaller than the first areal region. There can even be multiple second areal regions. The panes of the composite glass pane are joined over the entire surface via polymer film. According to the invention, the polymer film comprises at least a first type of polymer film and a second type of polymer film. The polymer film can include one or more further types of films that are used in further areal regions. These can, for example, be films that have electrically switchable functions or colored regions. In a preferred embodiment, the composite glass pane according to the invention has only one first areal region and one or a plurality of second areal regions, which, together, cover the entire area of the composite glass pane.

The polymer film of the first type and the polymer film of the second type can, in each case have a single-layer or multilayer structure. Preferably, the polymer film of the first type is implemented as a film laminate and/or the polymer film of the second type is implemented as a film laminate. Particularly preferably, the polymer film of the first type is implemented as a film laminate with, for example, three layers, and the polymer film of the second type is implemented as a single-layer polymer film.

The thicknesses of the first type of polymer film and of the second type of polymer film are substantially equal. This prevents stresses in the composite glass pane due to thickness variations at the transition between the first and second areal region.

According to the invention, "substantially equal" means that there is a difference of less than 30%, preferably less than 20%, and particularly preferably less than 10% between the thicknesses.

According to another practically significant embodiment, especially in the automotive industry, the composite glass pane is implemented as a windshield of a vehicle. Preferably, the composite glass pane is implemented as a windshield of a vehicle; and the second areal region is implemented as a central region thereof. The term "central region" means, in particular, the upper middle region of the windshield, in which, customarily, an inside mirror, a rain sensor, or similar add-on parts are mounted. Particularly preferably, the central region is directly adjacent the upper edge of the windshield. This can be produced particularly easily and improves the stability in the region of the edge.

More specifically, the second areal region has the shape of a rectangle or a rounded rectangle or a circle or an ellipse. Depending on the specific application, other shapes are also possible.

The invention can, however, also be used for rear windows or contiguous panorama glazings of passenger cars, where, for example, a rear window wiper, hinges, or joints, etc., are mounted; and comparable application possibilities also exist for watercraft and aircraft and glazing units for building glazing.

In a preferred embodiment, the composite glass pane is implemented as a windshield of a vehicle, and a fastening element is glued on the composite glass pane. Since the composite glass pane has higher stability in the second areal region, the mounting of the fastening element in this region is particularly advantageous. Thanks to the high stability in this region, an adhesive bond between the fastening element and the composite glass pane is possible. Particularly preferably, the fastening element is mounted on the inner-side of the windshield and is suitable for mounting an inside mirror. Preferably, an inside mirror is mounted via the fastening element.

According to the invention, when referring to a windshield of a vehicle, "up/upward" refers to the side of the pane pointing in the direction of the vehicle roof. In the installation position, the upper edge points upward toward the vehicle roof; the lower edge points downward toward the engine compartment in the installation position.

The "inner side" of a vehicle window is the side of the composite glass pane that, in the installation position, is intended to face the interior of the vehicle. The "outer side" of a vehicle window is the side of the composite glass that, in the installation position, is intended to face the outside surroundings of the vehicle.

In addition to the above described embodiments—but also independent thereof—provision can be made for the composite glass pane to be implemented as a windshield of the vehicle and for a plurality of second regions to be arranged in corner or edge regions thereof. Thus, the boundary regions with the A pillar (or in the case of a rear window, with the C pillar) and the roof edges, which are particularly stressed in the system of the car body structure during operation of the vehicle, can, in particular, be designed more load-resistant and thus more damage-resistant. Here, as well, the application possibilities are not restricted to road vehicles and, in particular, to passenger cars, but also can, in principle, be used on other vehicles and also on buildings in which composite glass panes are used.

In another preferred embodiment, the composite glass pane is implemented as a windshield of a vehicle, and the second areal region extends as a circumferential frame along the edges of the composite glass pane. The circumferential frame is directly adjacent the edges of the composite glass pane. The frame preferably has a width of 1 cm to 20 cm, particularly preferably of 2 cm to 10 cm. The width of the frame can vary along the individual pane edges. For example, the frame can be wider along the upper edge than along the lower edge of the pane such that a fastening element can be arranged centrally in the region of the upper edge. Since the windshield is joined to the vehicle body during installation in a vehicle via an adhesive joint at the edge of the pane, i.e., in the region of the circumferential frame, the mechanical load on the pane is particularly high in the region of the circumferential frame. As a result of reinforcement using a stiffer polymer film in the edge region, effective protection against pane breakage in the event of stone impact at the edge of the pane is achieved.

Furthermore, in expedient embodiments of the invention, provision is made for the or every second region to have an areal fraction of less than 25%, preferably less than 10% of the total area of the composite glass pane. In principle, it is possible, with a view to the greatest possible load capacity of the composite glass pane, to provide greater areal fractions with the stiffer polymer film of the second type; however, this is normally undesirable for reasons of cost. Preferably, the sum of all second areas is less than 50%, particularly preferably less than 30% of the total area of the composite glass pane.

In terms of material, provision can, in particular, be made for the first type of polymer film to be a polyvinyl butyral (PVB) film with a modulus of elasticity of less than 20 MPa and the second type of polymer film to be a PVB film with a modulus of elasticity greater than 100 MPa, measured in each case per Standard ASTM D882.

In an alternative embodiment, provision is made for the first type of polymer film to be a PVB film with a modulus of elasticity of less than 20 MPa and the second type of polymer film to be an ionomer film with a modulus of elasticity greater than 300 MPa, measured in each case per Standard ASTM D882.

In principle, both for the first areal region and for the one (or more) second areal region(s), polymer films with different chemical composition can be used, provided they meet the other requirements (transparency, durability, cost, etc.) and the above-mentioned relationship between the stiffness or modulus of elasticity of the first and second polymer film is maintained.

In an embodiment taking into account one of the current developments in automobile engineering, the thickness of the inner glass or polymer panes is less than 1.4 mm, in particular less than 1.2 mm. In principle, the invention can also be used in connection with greater pane thicknesses; however, the advantageous effects are naturally less significant.

Furthermore, provision is preferably made for the thickness of the first and the second type of polymer film to be equal and to be in the range between approx. 0.6 mm and 1.0 mm. When film laminates are used, the thickness can even be substantially greater. In principle, thicker or thinner polymer films can also be used, and even slight thickness differences between the polymer film of the first type and the polymer film of the second type can possibly be acceptable; however, the aforementioned thickness range and thickness matching between the two films are technically advantageous.

Another aspect of the present invention is a motor vehicle with a composite glass pane according to the invention installed therein, which is joined to the vehicle body via an adhesive joint in the edge region of the vehicle pane, wherein the vehicle pane is preferably a rear window or a windshield.

Figure 1B:
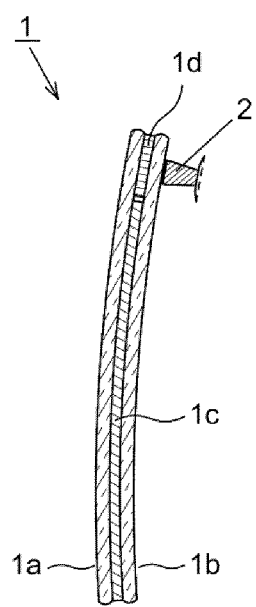
Figure 2:
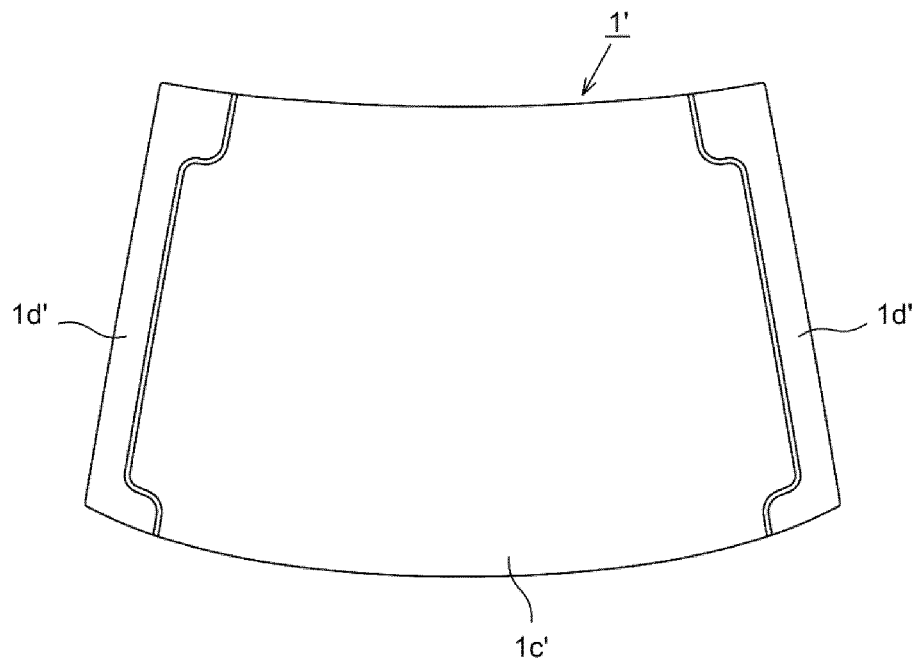
Figure 3:
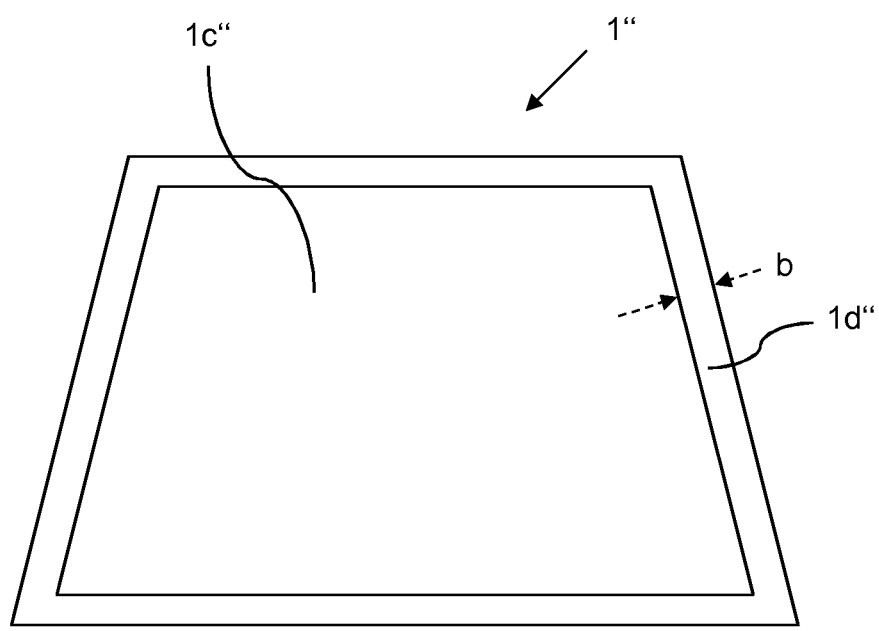

Advantages and practicalities of the invention are apparent from the following description of exemplary embodiments with reference to the figures. They depict:

FIGS. 1a and 1b schematic representations (plan view and sectional view) of a first exemplary embodiment of the invention, FIG. 2 a schematic representation (plan view) of a second exemplary embodiment of the invention, and FIG. 3 a schematic representation (plan view) of a third exemplary embodiment of the invention.

FIG. 1a schematically depicts a plan view of a passenger car windshield 1 in accordance with an exemplary embodiment of the invention, and FIG. 1b depicts a sectional view of the same, along a section plane A-A. The windshield 1 is formed as a composite glass pane having a first and second glass pane 1a, 1b with a thickness of 1.5 mm in each case and a first and second polymer film 1c, 1d glued between the glass panes. Most of the composite glass pane is formed with the polymer film 1c made of a PVB standardly used for such purposes with a thickness of approx. 0.75 mm. In a central upper region of the windshield 1, which is adjacent its upper edge, a rectangular section of the second polymer film 1d is inserted in a cutout of the first polymer film 1c, which second polymer film is an ionomer film of higher stiffness, as is, for instance, commercially available under the tradename SentryGlas®. This is the region in which a fixing element 2 for mounting an inside mirror is glued on the inner side of the windshield 1. It should be noted that the adhesive layer between the glass pane 1b and the fastening element 2 is not separately marked in FIG. 1b. Polyurethane adhesive, for example, or a suitable adhesive tape such as SBT (structural bonding tape) for automotive applications is suitable as an adhesive layer.

Through the provision of the stiffer polymer film 1d in the region of the mounting of the inside mirror, the mechanical load capacity of the composite glass pane 1 as a whole is increased to the extent that despite the use of relatively thin glass panes 1a, 1b, it meets the requirements defined in the relevant standards.

The effect of increasing the mechanical load capacity in the region of a second type of polymer film was successfully confirmed experimentally by the inventors. For this, the inventors carried out tests with specimens according to the invention, wherein, in a central second areal region, a PVB film with higher stiffness was used than in the first areal region, in which a standard PVB film was used. In the second areal region, an inside mirror was mounted on the thinner inner pane. Laminated glasses that were bonded completely via a standard PVB film were used as comparative specimens. The composite glass panes had in each case an outer pane of 2.1-mm-thick glass and an inner pane of 1.1-mm-thick glass. The polymer films had a thickness of approx. 0.8 mm. It was found that with the specimens according to the invention, the force that can act on the mirror as a lever before a thin inner pane breaks was twice as great.

FIG. 2 depicts schematically in a plan view another embodiment of the invention. Here, again, in another windshield 1', a first polymer film 1c' is used in by far the largest areal region of the windshield as well as a second, stiffer polymer film 1d' in the lateral edge and corner regions. In this embodiment, the stiffness of the windshield and thus its mechanical load capacity is increased specifically in the lateral edge and corner regions. This embodiment can be combined with that depicted in FIGS. 1a and 1b.

FIG. 3 depicts schematically in plan view another embodiment of the invention. The windshield 1" is implemented as a composite glass pane having a first glass pane 1a with a thickness of 2.1 mm and second glass pane 1b with a thickness of 1.1 mm. Here, a first type of polymer film 1c" is used in by far the largest areal region of the windshield in the form of a 0.8-mm-thick standard PVB film. A second areal region with a second type of polymer film 1d" is arranged in the form of a circumferential frame that is directly adjacent the edges of the composite glass pane 1". A 0.8-mm-thick, stiffer PVB film commercially available under the tradename Saflex®, DG41 is used as a second type of polymer film. The circumferential frame has a width b of approx. 5 cm and has substantially the same width along all edges. The windshield is provided for bonding to the body of a vehicle. Since the adhesive bonding in the region of the second areal region is done in the form of the circumferential frame, the stability of the vehicle pane is significantly improved, in particular in the event of a stone impact.

The practice of the invention is not limited to the above mentioned examples and highlighted aspects, but is also possible in a large number of variations within the scope of protection of the attached claims.

The composite glass pane according to the invention has, in another embodiment, two glass panes or two polymer panes or one glass pane and one polymer pane and at least one polymer film or film laminate bonded therebetween, wherein a first type of polymer film or a film laminate having a first stiffness is arranged in a first, larger areal region of the composite glass pane, and a second type of polymer film or film laminate having a second, higher stiffness than the first polymer film is arranged in at least one second areal region.

The composite glass pane preferably contains at least one polymer pane and the at least one polymer pane is preferably a polycarbonate pane or a polymethyl methacrylate pane.

The composite glass pane is preferably implemented as a windshield of a vehicle and the second areal region as a central region thereof.

The second areal region preferably has the shape of a rectangle or a rounded rectangle or a circle or an ellipse.

The composite glass pane is preferably implemented as a windshield of a vehicle and a plurality of second regions are arranged in corner or edge regions thereof.

The or every second region preferably has an areal fraction of less than 10% of the total area of the composite glass pane.

The first type of polymer film is preferably a PVB film with a modulus of elasticity of less than 20 Pa; and the second type of polymer film is a PVB film with a modulus of elasticity greater than 100 MPa, measured in each case per Standard ASTM D882.

The first type of polymer film is preferably a PVB film with a modulus of elasticity of less than 20 MPa; and the second type of polymer film is an ionomer film with a modulus of elasticity greater than 300 MPa, measured in each case per Standard ASTM D882.

The thickness of the inner glass or polymer pane is preferably less than 1.4 mm, in particular less than 1.2 mm.

The thickness of the first and second type of polymer film is preferably equal and is in the range between 0.6 mm and 1.0 mm.

The invention further includes a film product for producing a composite glass pane described above, wherein the film product has, in a first, larger areal region, a first type of polymer film or film laminate having a first stiffness; and, in at least one second areal region, a second type of polymer film or film laminate having a second, higher stiffness.

LIST OF REFERENCE CHARACTERS

1; 1',1" windshield (composite glass pane)
1a, 1b glass pane
1c, 1c', 1c" first type of polymer film, first polymer film
1d; 1d', 1d" second type of polymer film, second polymer film
2 fastening element, fixing element
b width of the circumferential frame

The invention claimed is:

1. A composite glass pane, which comprises two glass panes or two polymer panes or one glass pane and one polymer pane, and at least one polymer film bonded between the two glass panes or the two polymer panes or the one glass pane and the one polymer pane, wherein the at least one polymer film comprises a first type of polymer film having a first stiffness that is arranged in a first, larger areal region of the composite glass pane, and a second type of polymer film that is arranged in at least one second areal region, wherein the second type of polymer film has a second stiffness, which is higher than the stiffness of the first type of polymer film, and wherein thicknesses of the first type of polymer film and of the second type of polymer film are substantially equal, wherein the composite glass pane is implemented as a windshield of a vehicle, wherein the second areal region is implemented only as a central region of the windshield of a vehicle and is directly adjacent an upper edge of the windshield, wherein the second region has an areal fraction of less than 10% of a total area of the composite glass pane, wherein the first type of polymer film is a PVB film with a modulus of elasticity of less than 20 Mpa, and the second type of polymer film is a PVB film with a modulus of elasticity greater than 100 MPa, measured in each case per Standard ASTM D882, wherein a fastening element is adhered on the composite glass pane in the second areal region which is arranged on an inner-side of the windshield for mounting an inside mirror, and wherein the second areal region has the shape of a rectangle or a rounded rectangle or a circle or an ellipse and is inserted in a cutout of the first type of polymer film.

2. The composite glass pane according to claim 1, wherein the composite glass pane contains at least one polymer pane, and the at least one polymer pane is a polycarbonate pane or a polymethyl methacrylate pane.

3. The composite glass pane according to claim 1, wherein the thickness of the inner glass or polymer panes is less than 1.4 mm.

4. The composite glass pane according to claim 1, wherein the thicknesses of the first type of polymer film and of the second type of polymer film are in the range between 0.6 mm and 1.0 mm.

5. The composite glass pane according to claim 1, wherein the polymer film of the first type is implemented as a film laminate, and/or the polymer film of the second type is implemented as a film laminate.

6. The composite glass pane according to claim 3, wherein the thickness of the inner glass or polymer panes is less than 1.2 mm.

* * * * *